US010689280B2

(12) United States Patent
Morris, III

(10) Patent No.: US 10,689,280 B2
(45) Date of Patent: Jun. 23, 2020

(54) METHOD FOR THE REMOVING AND REDUCING SCALING

(75) Inventor: William H. Morris, III, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 786 days.

(21) Appl. No.: 12/650,714

(22) Filed: Dec. 31, 2009

(65) Prior Publication Data
US 2011/0155664 A1 Jun. 30, 2011

(51) Int. Cl.
C02F 5/12 (2006.01)
C02F 101/10 (2006.01)

(52) U.S. Cl.
CPC ............ C02F 5/125 (2013.01); C02F 5/12 (2013.01); C02F 2101/101 (2013.01); C02F 2101/105 (2013.01); C02F 2303/20 (2013.01); C02F 2303/22 (2013.01)

(58) Field of Classification Search
CPC .......... C02F 2101/101; C02F 2101/105; C02F 5/125
USPC ................. 210/696, 698, 638, 636
See application file for complete search history.

(56) References Cited

U.S. PATENT DOCUMENTS

| | | | | |
|---|---|---|---|---|
| 3,787,319 A * | 1/1974 | Larsen | ............ | 507/238 |
| 3,794,596 A * | 2/1974 | Tate | ............ | C09K 8/528 134/2 |
| 4,090,969 A * | 5/1978 | Koch et al. | ............ | 507/240 |
| 4,539,230 A | 9/1985 | Shimizu et al. | | |
| 4,604,212 A * | 8/1986 | Matz | ............ | C02F 5/12 210/700 |
| 4,612,354 A | 9/1986 | Shimizu et al. | | |
| 4,735,717 A * | 4/1988 | Sims | ............ | B01D 53/22 210/247 |
| 5,135,668 A * | 8/1992 | Larsen | ............ | 507/240 |
| 5,190,656 A * | 3/1993 | Paul et al. | ............ | 210/643 |
| 5,294,371 A | 3/1994 | Clubley et al. | | |
| 5,501,798 A * | 3/1996 | Al-Samadi | ............ | B01D 61/04 210/638 |
| 5,919,980 A * | 7/1999 | Dahanayake | ............ | B01D 61/145 210/651 |
| 6,255,118 B1 * | 7/2001 | Alfano | ............ | D21C 9/1036 422/67 |
| 6,955,222 B2 * | 10/2005 | Lien | ............ | 166/305.1 |
| 10,053,394 B2 * | 8/2018 | Gill | ............ | C05G 3/00 |
| 2004/0050800 A1 * | 3/2004 | Ito et al. | ............ | 210/764 |
| 2007/0093609 A1 | 4/2007 | Guzmann et al. | | |
| 2007/0267193 A1 * | 11/2007 | Hills et al. | ............ | 166/264 |
| 2008/0277620 A1 * | 11/2008 | Kesavan | ............ | C02F 5/10 252/175 |

FOREIGN PATENT DOCUMENTS

| | | | | |
|---|---|---|---|---|
| CA | 1902239 A | 1/2007 | | |
| CN | 101463302 A | 6/2009 | | |
| EP | 0126991 A1 | 12/1984 | | |
| EP | 0159185 * | 4/1985 | ............... | C02F 5/12 |
| EP | 96319 B1 | 3/1986 | | |
| JP | H 03146684 A | 6/1991 | | |
| JP | 2001212786 | 8/2001 | | |
| JP | 2002155298 | 5/2002 | | |
| JP | 2006334587 | 12/2006 | | |
| JP | 2008197128 | 8/2008 | | |
| JP | 2009185094 | 8/2009 | | |
| JP | 2010101744 | 5/2010 | | |
| WO | WO 2002/090463 A1 | 11/2002 | | |
| WO | WO2005044868 A1 | 5/2005 | | |

OTHER PUBLICATIONS

Cambridge Isotope Laboratories, "Buffers for NMR Studies," Mar. 2003, accessed from the Internet on May 6, 2012, http://www.isotope.com/cil/tech/library/pdfs/Buffers_March03_no$.pdf.*
Hawley's Condensed Chemical Dictionary, 14th ed., pub. by John Wiley & Sons, Inc., 2002.*
Oxford Dictionary, "Concise Oxford Dictionary," 10th ed., ed. Judy Pearsall, Oxford University Press, New York, 1999, 3 pages.*
Fisher Scientific, Material Safety Data Sheet (MSDS) for Betaine, Mar. 18, 2003, accessed on the Internet at https://fscimage.fishersci.com/msds/96491.htm on Mar. 24, 2018, 6 pages. (Year: 2003).*
Dow Filmtec, Membranes product information, first appeared on the Internet on Feb. 1, 2002, accessed on the Internet at http://msdssearch.dow.com/PublishedLiteratureDOWCOM/dh_082d/0901b8038082d595.pdf (Year: 2002).*
Extended European Search Report from corresponding EP App. No. 10841711.4, dated Nov. 4, 2015 (pgs.).

* cited by examiner

Primary Examiner — Bobby Ramdhanie
Assistant Examiner — Denise R. Anderson
(74) Attorney, Agent, or Firm — Eric D. Babych; Barnes & Thornburg LLP

(57) ABSTRACT

The invention relates to improved elimination of scale in processing systems. The method removes existing scale while also eliminating buildup. The invention relates to phosphate and sulfate scale. The invention further allows for improved anti-scaling without the need to make any pH adjustments. The method provides all factor listed while in no way compromises the integrity of membranes that may be used in the system.

8 Claims, No Drawings

METHOD FOR THE REMOVING AND REDUCING SCALING

TECHNICAL FIELD

This invention relates to improved elimination of calcium phosphate scale in processing systems. The invention also allows for improved anti scaling so that there is no build up in the system without pH adjustments. Further the invention in no way compromises the integrity of membranes if used in the system.

BACKGROUND

Calcium phosphate fouling is a growing concern for in many industries but most importantly in industries that use membranes for purification and filtration. The membrane operators due to new municipal applications and changes in water sources have seen an increase in calcium phosphate scaling and need an effective and safe method of eliminating the build of such scale. The traditional method of controlling scale, including calcium phosphate, is to feed acid which is effective but has some drawbacks firstly it can be detrimental to the membranes or reduce the use time before replacement is needed, secondly it can be cost prohibitive for large systems and finally there is safety concerns with the use of acid in high flow, high-pressure acid feed systems. This is why the industry has worked to discover new technologies for the use as an anti-sealant especially with phosphate scale.

The prevention of calcium phosphate scale in systems is exemplified in the process of membrane based water purification where the prevention of calcium phosphate fouling using anti-sealant has been met with limited success, if any. Factors contributing to this failure include the multiple forms of calcium phosphate, the slight negative charge of the membrane surface, and the negative effects of adding phosphonates and phosphates to water with a calcium phosphate scaling tendency. The current invention is a successful phosphate, sulfate and calcium inhibitors, which can be used in membrane based water purification as well as a broad range of other applications. In one embodiment the invention is used with membrane systems. In another embodiment the invention is used as a cleaner as trimethylglycine hydrochloride or as alternative salt such as trimethylglycine-potassium hydroxide or trimethylglycine-citric acid. In a further embodiment is used as a membrane performance enhancer.

SUMMARY

The invention consists of the addition of a solution of trimethylglycine to a system in effective amounts to eliminate the build up of scale or reduce existing scale build up. The solution includes compositions with the chemical formula of $C_5H_{11}NO_2 \cdot HCl$ such as such as trimethylglycine hydrochloride, carboxymethyl, trimethylammonium chloride and N,N,N-trimethylglycine hydrochloride.

Trimethylglycine is currently used as an agricultural product, which is typically extracted from sugar beet molasses with water. The major applications of trimethylglycine to date are livestock feed additive, human nutritional supplement, plant nutrition, and chemical reagent.

In the development of an anti-scaling composition and process of use it was discovered that trimethylglycine hydrochloride is effective at controlling calcium phosphate scale formation at various concentrations with dosage scaling with phosphate concentration. Trimethylglycine is a small zwitterionic molecule (a positive and negative charge on the same molecule resulting in no overall formal molecular charge) with a trimethylammonium group (cation) and a carboxylate group (anion) separated by a single methylene group and balanced with a chloride and a proton respectively. Typically, cation-containing anti-scalants are not used in membrane systems due to the fouling potential of classic cationic molecules and polymers. However, the close proximity of the cation and anion of trimethylglycine, due to bond angles and bonds distances along with the neutralization of localized charges due to intramolecular coulombic forces, gives support to membrane compatibility. Actual membrane compatibility studies have been completed showing membrane compatibility at both low and high dosage concentrations.

The current invention describes the following key aspects:
1. It is an advantage of the invention to eliminate the build up of scale in a system.
2. It is an advantage of the invention to aid in the descaling of systems.
3. It is an advantage of the invention to provide improved anti-scaling abilities while not hindering the performance of membranes or filtration systems.
4. It is an advantage of the invention to work effectively with a wide range of scale forms including calcium phosphate.
5. It is an advantage of the invention to eliminate the build up of scale in a system without the need to adjust the pH.

DETAILED DESCRIPTION

The invention is a method for the reduction and/or control of scaling in a system with the addition of a trimethylglycine composition into the system reducing scaling and scale buildup. The trimethylglycine composition that is used in the method may include one or more of the following: trimethylglycine hydrochloride, carboxymethyl, betaine hydrochloride, trimethylammonium chloride and N,N,N-trimethylglycine hydrochloride, trimethylglycine-potassium hydroxide and/or trimethylglycine-citric acid. The most preferred trimethylglycine composition is trimethylglycine hydrochloride.

The invention can be used with various systems and in one embodiment it is used in a water purification system. The system allows for the safe use of a membrane within the process. The current invention allows the membrane to maintain its integrity and can also increase its effectiveness by reducing any scale that can effect the membrane.

The method has the trimethylglycine composition added in a concentration proportionate to the concentration of the scale in the system. The composition is preferable added in a concentration of greater than or equal to 0.2 ppm. The composition can also be added in a concentration equal to or less than 25 ppm. The invention can also use one or more anti scaling or cleaning composition in addition to the trimethylglycine composition. The method can be used with phosphate or sulfate scale.

The trimethylglycine composition of the claimed invention may be a zwitterionic molecule. The zwitterionic molecule may have a trimethylammonium group and a carboxylate group connected by a single methylene group with a chloride group. The trimethylglycine composition in the claimed invention may be is added to the processing system consistently or intermittently. The invention also allows for the addition of trimethylglycine composition and eliminates the need for any pH adjustment by any means.

EXAMPLES

The foregoing may be better understood by reference to the following examples, which are intended to illustrate methods for carrying out the invention and are not intended to limit the scope of the invention. The current experiments were run at 25 degrees Celsius and 45 minute induction periods. The process consisted of the use of 130 ml deionized water in an Erlenmeyer flask charged with a stir bar, standard solutions containing ions of 1.0 M NaCl (25 ml), 0.1 M $Na_2HPO_4$ (0.016 ml), and 0.1 M $CaCl_2$ (40.0 ml) were added. If an antis-calant was evaluated then it was added at this step with the appropriate volume of deionized water added to experiment to keep the over all total volumes the same and thus ion concentrations the same. Then turbidity was measured using a handheld turbidity meter (aliquots removed for measurements were returned to mother liquid) and pH was measured using a VWR symphony pH meter. After 45 minutes the turbidity and pH were measured again followed by the addition of 0.1 M $Na_2HPO_4$. Finally the steps were repeated until the turbidity at the end of a 45 min period measured above 2.0 NTU, which concluded the experiment for that water chemistry.

Ultimately, the collective data from a group experiments allows for the identification of scale initiation and scale failure for critical phosphate concentrations of ATMP (1 and 12.5 ppm), AA/AMPS (8.25 ppm), and TMG HCl (0.8 and 10 ppm). Table 1 gives the compilation of data to demonstrate the effectiveness of TMG and to some degree the ineffectiveness of AMP. AA/AMPS is a calcium phosphate anti-scalant used in cooling water and boiler applications with limited use in membrane applications at low concentrations for assured membrane compatibility.

TABLE 1

Compilation of critical phosphate concentrations for various experiments.

|  |  | Phosphate Concentration at Scale Initiation (NTU > 0.3) | Phosphate Concentration at Scale Failure (NTU > 2.0) |
| --- | --- | --- | --- |
| Control | 0 ppm | 34 | 48.5 |
| AMP | 1 ppm | 34 | 48.5 |
|  | 12.5 ppm | 19.4 | 38.8 |
| AA/AMPS | 8.25 ppm | 38.8 | 58.1 |
| TMG HCl | 0.8 ppm | 43.6 | 53.3 |
|  | 10 ppm | 53.3 | 62.9 |

A follow-up experimental set was conducted to determine if the effect seen in the first set was from mitigation of calcium phosphate scale or from changes to the pH of the solutions. In addition to repeating the control and the TMG HCl work, a third experiment was prepared with the pH adjusted to be the same as the TMG HCl at 10 ppm. The water chemistry and experimental protocol is identical to the procedure used in example 1. These results prove the effect TMG HCl controls the initiation of calcium phosphate scale (nucleation) and mitigates the growth in some manner.

TABLE 2

Compilation of critical phosphate concentrations for various experiments.

|  |  | Phosphate Concentration at Scale Initiation (NTU > 0.3) | Phosphate Concentration at Scale Failure (NTU > 2.0) |
| --- | --- | --- | --- |
| Control | 0 ppm | 24.3 | 43.6 |
| HCl |  | 38.8 | 53.3 |
| TMG HCl | 10 ppm | 53.3 | 62.9 |

Phosphate Test for 10 ppm Trimethylglycine

Tests were run to determine the types of phosphates present at the on-set of scale in the presence of TMG HCl at 10 ppm. The experiment was carried to the point of having 53.3 ppm phosphate added which gives a pH of 6.96 and turbidity of 0.74. The effectiveness of TMG as an inhibitor of calcium phosphate scale is corroborated by data showing 95% of the total phosphate measured as orthophosphate. This data indicates that scale is occurring, but the growth event is inhibited by the trimethylglycine.

TABLE 3

Measured phosphate levels by filtered and unfiltered methods (total, inorganic, and ortho) along with the calculated values for filtered and unfiltered organic phosphate.

| Phosphate Types | Filtered | Unfiltered |
| --- | --- | --- |
| Total | 54.5 ppm | 55.5 ppm |
| Inorganic | 52.5 | 52.5 |
| Ortho | 52.0 | 53.0 |

Compatibility Tests for Trimethylglycine on ESPA1 Membrane

Membrane compatibility tests were run to evaluate trimethylglycine using Hydronautics ESPA1 membranes and an Osmonics flat plate membrane system. To date dosages of 10, 20, and 40 ppm trimethylglycine hydrochloride have been run, with return to control levels for all parameters. During exposure of trimethylglycine there was a decrease in permeate conductivity (27% for 20 ppm and 40% for 40 ppm) with a slight increase in flux (0.7%) when running at 20 ppm trimethylglycine and a decrease in flux (1.8%) when running at 40 ppm trimethylglycine. For all sodium chloride controls all parameters have returned to original conditions. It is worth noting that these experiments were run evaluating actives concentrations. This is much higher what would be expected in the reject water of most systems and water chemistries.

I claim:
1. A method, comprising:
  adding an effective amount of a trimethylglycine composition into a water purification system comprising a membrane in order to reduce calcium phosphate scaling and scale buildup in the water purification system, wherein the trimethylglycine composition controls the initiation of the calcium phosphate scale nucleation, and mitigates its growth, wherein the trimethylglycine composition includes one or more of the following compounds selected from the group consisting of trimethylglycine hydrochloride and trimethylglycine-citric acid, wherein the trimethylglycine composition is put into the water purification system without the need for pH adjustment, and wherein the effective amount is between 0.2 ppm and 0.8 ppm.

2. The method of claim 1, wherein the trimethylglycine composition added in a concentration proportionate to a concentration of the scale in the water purification system.

3. The method of claim 1 wherein the trimethylglycine composition is added to the water purification system consistently.

4. The method of claim 1 wherein the trimethylglycine composition is added to the water purification system intermittently.

5. A method, consisting of:
adding a scale inhibitor composition into a water purification system comprising a membrane, wherein the scale inhibitor composition consists of trimethylglycine hydrochloride.

6. The method of claim 5, wherein the scale inhibitor composition is added to the water purification system in an amount ranging from 0.2 ppm to 0.8 ppm.

7. The method of claim 5, wherein the scale inhibitor composition is added to the water purification system in an amount of 0.2 ppm.

8. A method, consisting of:
adding a scale inhibitor composition into a water purification system comprising a membrane, wherein the scale inhibitor composition consists of a chemical of formula $C_5H_{11}NO_2 \cdot HCl$.

* * * * *